United States Patent [19]
Erndt et al.

[11] Patent Number: 4,906,882
[45] Date of Patent: Mar. 6, 1990

[54] ROTOR FOR AN ELECTRIC MOTOR ENERGIZED BY PERMANENT MAGNET MEANS

[75] Inventors: Hans Erndt, Im Hossacker; Walter Ripplinger, Rheinhausen, both of Fed. Rep. of Germany

[73] Assignees: Frankl & Kirchner GmbH & Co. KG, Schwetzingen; Fabrik für Electromotoren u. elektrische Apparate, Baden, both of Fed. Rep. of Germany

[21] Appl. No.: 317,555

[22] Filed: Mar. 1, 1989

[30] Foreign Application Priority Data

Mar. 12, 1988 [DE] Fed. Rep. of Germany ... 8803372[U]

[51] Int. Cl.[4] .................. H02K 21/12; H02K 1/22
[52] U.S. Cl. .................... 310/156; 310/261; 310/43; 29/598
[58] Field of Search .......... 310/42, 43, 152, 214, 310/216, 156, 261, 265; 29/598

[56] References Cited

U.S. PATENT DOCUMENTS 4,678,954 7/1987 Takeda .................. 310/261
4,683,393 7/1987 Stokes .................. 310/156

FOREIGN PATENT DOCUMENTS 8427703 3/1986 Fed. Rep. of Germany .

Primary Examiner—Patrick R. Salce
Assistant Examiner—C. LaBalle
Attorney, Agent, or Firm—Felfe & Lynch

[57] ABSTRACT

A rotor for an electric motor energized by permanent magnet means comprises positioning devices for permanent magnets. These positioning devices consist of positioning rings disposed in the region of each end face of a rotor body and at least one inner positioning ring disposed on the rotor body between the two. The positioning rings comprise positioning webs which extend only over a small part of the length of the outer peripheral surface of the rotor body and which partially define compartments for in each case a permanent magnet. On the one hand, this ensures accurate and simple mounting of the permanent magnet while at the same time it reduces the moment of inertia of the rotor.

24 Claims, 1 Drawing Sheet 4,906,882

ROTOR FOR AN ELECTRIC MOTOR ENERGIZED BY PERMANENT MAGNET MEANS

FIELD OF THE INVENTION

The invention relates to a rotor for an electric motor energised by permanent magnet means and comprising a substantially cylindrical rotor body with, projecting coaxially therefrom, shaft portions of which permanent magnets are located by positioning means axially and tangentially in relation to the rotor body and are fixed on the outer peripheral surface thereof.

BACKGROUND OF THE INVENTION

In the case of such a rotor of the type mentioned at the outset and already known from German utility model No. 84 27 703, the individual permanent magnets are fixed by means of a positioning cage on the cylindrical rotor body which serves as the carrying member. This positioning cage is constructed in one piece and consists of end rings and longitudinal webs which connect these to form one body. Preferably, it is injection moulded onto the rotor body after the magnet segments have been previously fitted. Alternatively, it can also be pushed on with the permanent magnets inserted into the rotor cage and then fixed on the outer periphery of the rotor body. A disadvantage of this is that the manufacturing costs are substantial and that the moment of inertia of the rotor as a whole is increased by the weight of the cage, which is particularly significant since the positioning cage is disposed in the outer periphery of the rotor.

SUMMARY OF THE INVENTION

It is an object of the invention to develop a rotor of the type mentioned at the outset that on the one hand is accurate and simple fitment of the permanent magnets is possible while at the same time the moment of inertia of the rotor is reduced.

According to the invention, this problem is solved by the features that the positioning means comprise in each case, disposed in the region of each end face of a rotor body, a positioning ring and, disposed between the latter and on the rotor body, at least one inner positioning ring, provided with positioning webs which extend over only a small portion of the length of the outer peripheral surface of the rotor body, one positioning ring and the inner positioning ring on the one hand and mutually aligned positioning webs on the other, partially defining compartments for in each case one permanent magnet. Where the solution according to the invention is concerned, the positioning means comprise only three positioning rings which are fitted onto the rotor body, these positioning rings having stub-like positioning webs between which the permanent magnets are orientated. The total mass of these positioning rings is extremely small compared with a one-piece positioning cage so that also a corresponding reduction of the moment of inertia of the entire rotor is achieved.

Further advantages and features of the invention will become apparent from the ensuing description of an embodiment taken in conjunction with the drawings.

DESCRIPTION OF THE PREFERRED EMBODIMENT

Figure 2:
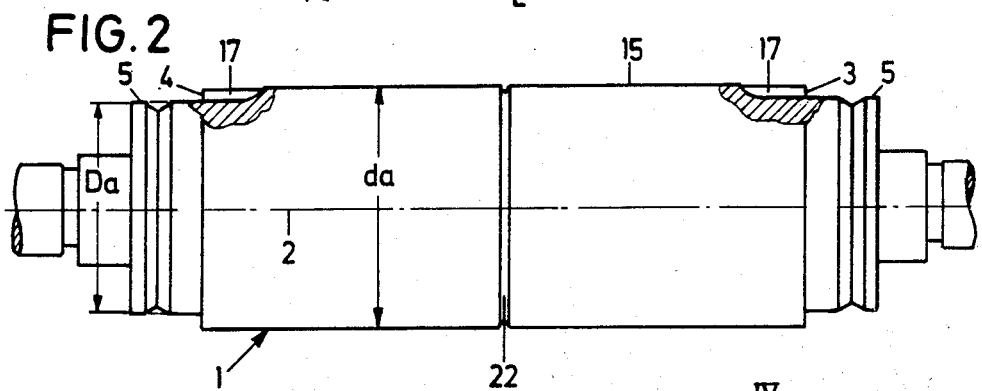
FIG. 2 is a longitudinal view of the rotor body with portions cut away.
Figure 4:
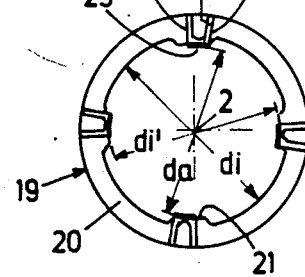
FIG. 4 shows a cross-section through a positioning ring taken on the line IV—IV in FIG. 3
Figure 3:
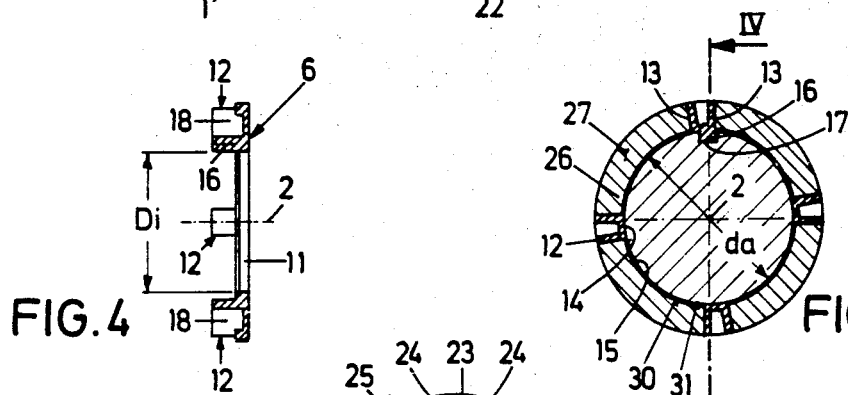
FIG. 3 shows a cross-section through the rotor taken on the line III—III in FIG. 1.
Figure 5:
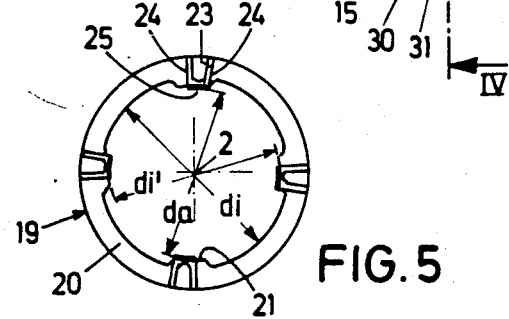
FIG. 5 is a plan view of an intermediate positioning ring.

The rotor shown in the drawings comprises in conventional manner a cylindrical rotor body 1 shown in FIG. 2 and constructed to be concentric with a central longitudinal axis 2. Concentric with this axis there are on the two flat end faces 3, 4 of the rotor body 1 and integral therewith, cylindrical receiving portions 5 to accommodate positioning rings 6. In conventional manner, there are adjacent the two receiving portions 5 shaft portions 7, 8. A conical portion 9 to accommodate an output wheel, for example a belt pulley, is constructed on shaft portion 8 which is on the output side and adjacent to that is a screw-threaded portion 10 to receive a fixing nut for locking the output wheel.

The two identically constructed positioning rings 6 comprise an annular disc 11 the inside diameter Di of which is a few tenths of a millimetre smaller than the outside diameter Da of the cylindrical receiving portions 5 of the rotor body 1. The positioning rings 6 which consist of injection mouldable, in other words elastic synthetic plastics material, when they have been pressed onto the relevant receiving portion 5, are seated thereon in a clearance free manner. The annular discs 11 are in each case provided on one side with positioning webs 12 disposed at equal angular intervals and extending parallel with the axis 2, the said positioning webs being of hollow construction to reduce weight and to save on material. Their lateral faces 13 extend radially of the axis 2. Their inner surfaces 14 bear on a cylindrical surface around the axis 2, in other words they are seated virtually without clearance on the outer peripheral surface 15 of the rotor body 1. The positioning rings 6 are so pushed onto the receiving portions 5 that the annular disc 11 bears on the relevant end face 3, 4 of the rotor body 1, so that the positioning webs 12 extend over a small axial portion 1 of the rotor body 1. On the inside face of a positioning web 12 there is a projection 16 which is constructed in the manner of a spring which engages a corresponding positioning groove 17 constructed in the outer peripheral surface 15 of the rotor body 1 and extending parallel with the axis 2 from the end faces 3, 4. There, the angular position of the positioning rings 6 in relation to the rotor body 1 is established, while their axial position is secured by the end faces 3, 4 which act as abutments.

On their inside faces which are towards the positioning webs 12, the annular discs 11 are provided with recesses 18 in order to save on weight and materials.

Disposed in the middle of the overall length L of the rotor body 1 is an inner positioning ring 19 which consists of a thin annular disc 20, the inside diameter di of which is greater than the outside diameter da of the rotor body 1. Constructed at identical angular intervals there are in the present case four radially inwardly projecting locking webs 21 of which the inside diameter di' is a few tenths of a millimeter smaller than the outside diameter da of the rotor body 1. To accommodate these locking webs 21 there is constructed in the longitudinal centre of the rotor body 1 an annular groove 22 in which the locking webs 21 engage. Since also the inner positioning ring 19 consists of injection mouldable elastic synthetic plastics material, it can, with a corresponding elastic deformation of the locking webs 21, be pushed axially from one of the end faces 3, 4 and over the outer peripheral surface 15 of the rotor body 1. When the annular groove 22 is reached, the locking webs 21 snap into place in it, so establishing the axial position of the inner positioning rings 19 in relation to the rotor body 1.

Figure 1:
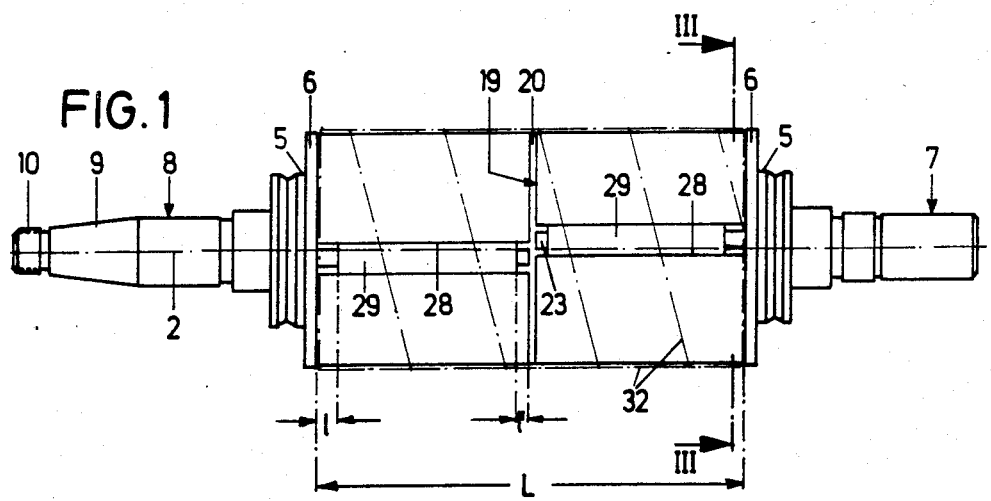
FIG. 1 is a longitudinal view of a rotor.

Constructed on the two end faces of the annular disc 20 of the inner positioning ring 19 are positioning webs 23 which correspond in cross-section to the positioning webs 12. Therefore, they comprise lateral surfaces 24 which extend radially of the axis 2. Their relevant inner surfaces 25 lie on a cylindrical surface around the axis 2. These inner surfaces 25 likewise rest at least approximately without clearance on the outer peripheral surface 15 of the rotor body 1. The mutually opposite inner faces 25, in the same way as the corresponding inner faces 14, in each case enclose a diameter da. The axial extension 1' of the positioning webs 23 may be smaller than the corresponding extension 1 of the positioning webs 12. The positioning webs constructed on the two end faces of the annular disc 20 can be angularly offset in relation to one another, as FIG. 1 shows. They lie in each case on a generatrix in relation to the facing positioning webs 12 of the relevant facing positioning ring 6. The mutually facing positioning webs 12 and 23 are therefore aligned with one another.

Constructed between each positioning ring 6 and the inner positioning ring 19 are compartments 26 in which are disposed permanent magnets 27 the end faces (not especially designated) of which bear on the relevant annular discs 11 or 20 while their side faces 28 bear against the side faces 13, 24 of the positioning webs 12, 23 so that they are positioned both axially and tangentially in relation to the rotor body 1. The space between the mutually opposite positioning webs 12 and 23 and the lateral faces 28 is in each case a clear space 29. The permanent magnets 27 are fixed by their inner surfaces 30 on the outer peripheral surface 15 of the rotor body 1 by a layer 31 of adhesive. Tangential fixing of the inner positioning ring 19 in relation to the rotor body 1 is unnecessary since the tangential position, in other words the angular position of the inner positioning ring 19 in relation to the positioning rings 6, adjusts itself automatically when the permanent magnets 27 are fitted. After the installation which has been described so far, the rotor can be given an outer bandage 32 to prevent the permanent magnets 27 from being thrown partially or entirely out of their position by the centrifugal forces which arise.

The length 1 or 1' of the positioning webs 12 or 23 is in the region of 2% to 3% respectively of the total length L of the rotor body. Their length should not exceed 5% and under no circumstances should it exceed 10%.

I claim:

1. A rotor for an electric motor energized by permanent magnet means and comprising a substantially cylindrical rotor body with, projecting coaxially therefrom, shaft portions of which permanent magnets having end faces are located by positioning means axially and tangentially in relation to the rotor body and are fixed on the outer peripheral surface thereof, wherein the positioning means comprise in each case, disposed in the region of each end face of a rotor body, a positioning ring and, disposed between the latter and on the rotor body, at least one inner positioning ring, provided with positioning webs which extend over only a small portion of the length (L) of the outer peripheral surface of the rotor body, said positioning webs having side faces, one positioning ring and the inner positioning ring which bear against said end faces of said magnets on the one hand and mutually aligned side faces of said positioning webs on the other, partially defining compartments for in each case one permanent magnet.

2. A rotor according to claim 1, wherein for the length (1, 1') of the positioning webs in respect of the length (L) of the outer peripheral surface of the rotor body (1), $1<0.1\,L$ and $1'<0.1L$.

3. A rotor according to claim 2, wherein for the length (1, 1') of the positioning webs in relation to the length (L) of the outer peripheral surface of the rotor body (1), $1<0.05\,L$ and $1'<0.05L$.

4. A rotor according to claim 1, wherein the positioning rings bear axially and without clearance on a respective end face of the rotor body.

5. A rotor according to claim 1, wherein the positioning rings and the inner positioning ring consist of rigidly-elastic synthetic plastics material.

6. A rotor according to claim 1, wherein the positioning webs are of hollow construction.

7. A rotor for an electric motor energized by permanent magnet means and comprising a substantially cylindrical rotor body with, projecting coaxially therefrom, shaft portions of which permanent magnets are located by positioning means axially and tangentially in relation to the rotor body and are fixed on the outer peripheral surface thereof, wherein the positioning means comprise in each case, disposed in the region of each end face of a rotor body, a positioning ring and, disposed between the latter and on the rotor body, at least one inner positioning ring, provided with positioning webs which extend over only a small portion of the length (L) of the outer peripheral surface of the rotor body, one positioning ring and the inner positioning ring on the one hand and mutually aligned positioning webs on the other, partially defining compartments for in each case one permanent magnet, and wherein the inner positioning ring comprises radially inwardly directed locking webs which engage an annular groove in the outer peripheral surface of the rotor body.

8. A rotor according to claim 7, wherein for the length (1, 1') of the positioning webs in respect of the length (L) of the outer peripheral surface of the rotor body, $1<0.1\,L$ and $1'<0.1L$.

9. A rotor according to claim 8, wherein for the length (1, 1') of the positioning webs in relation to the length (L) of the outer peripheral surface of the rotor body, $1<0.5\,L$ and $1'<0.05L$.

10. A rotor according to claim 7, wherein the positioning rings bear axially and without clearance on a respective end face of the rotor body.

11. A rotor according to claim 7, wherein the positioning rings and the inner positioning ring consist of rigidly-elastic synthetic plastics material.

12. A rotor according to claim 7, wherein the positioning webs are of hollow construction.

13. A rotor for an electric motor energized by permanent magnet means and comprising a substantially cylindrical rotor body with, projecting coaxially therefrom, shaft portions of which permanent magnets are located by positioning means axially and tangentially in relation to the rotor body and are fixed on the outer peripheral surface thereof, wherein the postioning means comprise in each case, disposed in the region of each end face of a rotor body, a positioning ring and, disposed between the latter and on the rotor body, at least one inner positioning ring, provided with positioning webs which extend over only a small portion of the length (L) of the outer peripheral surface of the rotor body, one positioning ring and the inner positioning ring on the one hand and mutually aligned positioning webs on the other, partially defining compartments for in each case one permanent magnet, wherein the positioning rings in each case comprise a radially inwardly protruding projection which engages a positioning groove in the outer peripheral surface of the rotor body.

14. A rotor according to claim 13, wherein for the length (1, 1') of the positioning webs in respect of the length (L) of the outer peripheral surface of the rotor body, $1 < 0.1 L$ and $1' < 0.1L$.

15. A rotor according to claim 14, wherein for the length (1, 1') of the positioning webs in relation to the length (L) of the outer peripheral surface of the rotor body, $1 < 0.05 L$ and $1' < 0.5L$.

16. A rotor according to claim 13, wherein the positioning rings bear axially and without clearance on a respective end face of the rotor body.

17. A rotor according to claim 13, wherein the positioning rings and the inner positioning ring consist of rigidly-elastic synthetic plastics material.

18. A rotor according to claim 13, wherein the positioning webs are of hollow construction.

19. A rotor for an electric motor energized by permanent magnet means and comprising a substantially cylindrical rotor body with, projecting coaxially therefrom, shaft portions of which permanent magnets are located by positioning means axially and tangentially in relation to the rotor body and are fixed on the outer peripheral surface thereof, wherein the positioning means comprise in each case, disposed in the region of each end face of a rotor body, a positioning ring and, disposed between the latter and on the rotor body, at least one inner positioning ring, provided with positioning webs which extend over only a small portion of the length (L) of the outer peripheral surface of the rotor body, one positioning ring and the inner positioning ring on the one hand and mutually aligned positioning webs on the other, partially defining compartments for in each case one permanent magnet, wherein the positioning rings are constructed as annular discs and are in each case mounted without radial clearance on a cylindrical receiving portion which is immediately adjacent the rotor body.

20. A rotor according to claim 1, wherein for the length (1, 1') of the positioning webs in respect of the length (L) of the outer peripheral surface of the rotor body, $1 < 0.1 L$ and $1' < 0.1L$.

21. A rotor according to claim 20, wherein for the length (1, 1') of the positioning webs in relation to the length (L) of the outer peripheral surface of the rotor body, $1 < 0.5 L$ and $1' < 0.05L$.

22. A rotor according to claim 19, wherein the positioning rings bear axially and without clearance on a respective end face of the rotor body.

23. A rotor according to claim 19, wherein the positioning rings and the inner positioning ring consist of rigidly-elastic synthetic plastics material.

24. A rotor according to claim 19, wherein the positioning webs are of hollow construction.

* * * * *